(12) United States Patent
Yahia

(10) Patent No.: US 12,522,053 B2
(45) Date of Patent: Jan. 13, 2026

(54) REFRIGERATING FLUID CIRCUIT COMPRISING AN ACCUMULATOR BYPASS BRANCH

(71) Applicant: VALEO SYSTEMES THERMIQUES, La Verriere (FR)

(72) Inventor: Mohamed Yahia, La Verriere (FR)

(73) Assignee: VALEO SYSTEMES THERMIQUES, La Verriere (FR)

( * ) Notice: Subject to any disclaimer, the term of this patent is extended or adjusted under 35 U.S.C. 154(b) by 146 days.

(21) Appl. No.: 18/255,619

(22) PCT Filed: Nov. 22, 2021

(86) PCT No.: PCT/EP2021/082397
§ 371 (c)(1),
(2) Date: Jun. 2, 2023

(87) PCT Pub. No.: WO2022/117374
PCT Pub. Date: Jun. 9, 2022

(65) Prior Publication Data
US 2024/0100912 A1 Mar. 28, 2024

(30) Foreign Application Priority Data
Dec. 2, 2020 (FR) ...................... 2012504

(51) Int. Cl.
*B60H 1/32* (2006.01)
*B60H 1/00* (2006.01)

(52) U.S. Cl.
CPC ....... *B60H 1/3229* (2013.01); *B60H 1/00278* (2013.01); *B60H 1/323* (2013.01)

(58) Field of Classification Search
CPC ...... F25B 2400/0409; F25B 2400/0411; F25B 2600/2501; F25B 2600/2507; F25B 5/02;
(Continued)

(56) References Cited

U.S. PATENT DOCUMENTS 7,628,025 B2  12/2009  Kang
2019/0375270 A1  12/2019  Boger et al.

FOREIGN PATENT DOCUMENTS

| CN | 102059932 A | 5/2011 | |
| CN | 209197195 U * | 8/2019 | .............. F25B 1/053 |

(Continued)

OTHER PUBLICATIONS

European Patent Office, International Search Report (with English translation) of corresponding International Application No. PCT/EP2021/082397, dated Feb. 24, 2022.
(Continued)

*Primary Examiner* — Kun Kai Ma
(74) *Attorney, Agent, or Firm* — Osha Bergman Watanabe & Burton LLP

(57) ABSTRACT

A refrigerant fluid circuit for a heat treatment system, including a main branch starting at a first convergence point and terminating at a first divergence point and including at least one accumulator, a compression device and a first heat exchanger, the refrigerant fluid circuit including a first branch and a second branch, both starting at the first divergence point and terminating at the first convergence point, the first branch including a second heat exchanger, the second branch including a third heat exchanger. The refrigerant fluid circuit includes a bypass branch which starts at a second divergence point situated on the second branch, downstream of the third heat exchanger, and which terminates at a second convergence point situated on the main branch, downstream of the at least one accumulator and upstream of the compression device.

15 Claims, 5 Drawing Sheets

(58) Field of Classification Search
CPC .......... F25B 40/00; F25B 40/04; F25B 41/20;
F25B 43/006; F25B 49/02; B60H
2001/00307
See application file for complete search history.

(56) References Cited

FOREIGN PATENT DOCUMENTS

| | | | | |
|---|---|---|---|---|
| DE | 102011118162 B4 * | 1/2016 | ......... | B60H 1/00921 |
| DE | 102019107196 A1 | 9/2020 | | |
| EP | 3674627 A1 | 7/2020 | | |
| JP | 2007226336 A * | 9/2007 | | |
| JP | 2013257072 A | 12/2013 | | |
| JP | 2014134316 A * | 7/2014 | | |
| JP | 2018087665 A * | 6/2018 | .............. | F25B 13/00 |
| JP | 2020104591 A | 7/2020 | | |
| WO | 2011018400 A1 | 2/2011 | | |
| WO | 2011092802 A1 | 8/2011 | | |
| WO | WO-2017022076 A1 * | 2/2017 | .............. | F25B 13/00 |
| WO | 2018051038 A1 | 3/2018 | | |
| WO | 2019065548 A1 | 4/2019 | | |
| WO | 2019135049 A1 | 7/2019 | | |

OTHER PUBLICATIONS

Office Action issued by the Chinese Patent Office for corresponding Chinese Patent Application No. 202180092059.6, mailed Aug. 13, 2025 (7 pages).

* cited by examiner

REFRIGERATING FLUID CIRCUIT COMPRISING AN ACCUMULATOR BYPASS BRANCH

TECHNICAL FIELD

The field of the present invention is that of heat treatment systems used for heating or cooling a space or a component of a vehicle, notably a passenger compartment or a component of a powertrain of this vehicle. More particularly, the present invention concerns a refrigerant fluid circuit included in such heat treatment systems.

BACKGROUND OF THE INVENTION

Motor vehicles are currently equipped with a refrigerant fluid circuit and with a heat transfer fluid circuit, which are both used to contribute to a heat treatment of various zones or various components of the vehicle. It is notably known for this refrigerant fluid circuit to be used to thermally treat an air flow sent into the passenger compartment of the vehicle equipped with such a circuit.

In another application of this circuit, it is known for the heat transfer fluid circuit to be used to cool components of the powertrain of the vehicle, such as an electrical storage device, the latter being used to supply energy to an electric motor capable of moving the vehicle. The refrigerant fluid circuit contributes indirectly to such cooling by acting thermally on the heat transfer fluid circuit via at least one heat exchange between the two fluids. The heat treatment system thus supplies the energy capable of cooling the electrical storage device when it is used during driving phases. In order to cool the heat transfer fluid, the refrigerant fluid circuit notably comprises a compression device for compressing the refrigerant fluid in the gaseous state, and an accumulator making it possible to retain the refrigerant fluid in the liquid state such that the latter does not circulate through the compression device and damage it.

The need for cooling of the heat transfer fluid such that the latter can cool the electrical storage device can increase drastically when the electrical storage device needs to be recharged very rapidly. For this reason, the heat treatment system can comprise two heat exchangers in order to improve the cooling capacity of the heat transfer fluid by the refrigerant fluid, one of the heat exchangers being connected to the accumulator, the other bypassing the latter in order to maintain a circulating charge within the refrigerant fluid circuit.

In order to limit production costs, it is nevertheless possible to be limited to a single heat exchanger that is intended to perform the cooling of the electrical storage device and that ensures the exchange of heat between the two fluid circuits. In such a configuration, and as a function of an operating mode of the refrigerant fluid circuit, the refrigerant fluid at the output of such a heat exchanger cannot be directed entirely to the accumulator and cannot bypass the latter entirely either in order to maintain the circulating charge while preserving a service life of the components of the refrigerant fluid circuit.

SUMMARY OF THE INVENTION

The present invention makes it possible to overcome this drawback by proposing a refrigerant fluid circuit for a heat treatment system, comprising a main branch starting at a first convergence point and terminating at a first divergence point and comprising at least one accumulator, a compression device and at least a first heat exchanger, the refrigerant fluid circuit comprising at least a first branch and a second branch, both starting at the first divergence point and terminating at the first convergence point, the first branch comprising at least a second heat exchanger, the second branch comprising at least a third heat exchanger, characterized in that the refrigerant fluid circuit comprises a bypass branch which starts at a second divergence point situated on the second branch, downstream of the third heat exchanger, and which terminates at a second convergence point situated on the main branch, downstream of the accumulator and upstream of the compression device.

By virtue of such a circuit, the refrigerant fluid can, after heat treatment within the third heat exchanger, be directed to the accumulator or bypass the latter as a function of an operating mode of the refrigerant fluid circuit. Such an arrangement makes it possible to maintain a circulating charge within the refrigerant fluid while prolonging the proper operation of the components of the circuit, more particularly the operation of the compression device.

The compression device is responsible for circulating the refrigerant fluid within the circuit, notably by compressing the refrigerant fluid in the gaseous state at high pressure, this also having the effect of increasing its temperature.

Each of the heat exchangers that are disposed in the refrigerant fluid circuit participates in a heat exchange involving at least the refrigerant fluid. Said refrigerant fluid can, as a function of the operating mode of the circuit, thus give up or take up heat energy via these heat exchanges.

The accumulator is disposed upstream of the compression device with respect to a circulation direction of the refrigerant fluid. The accumulator can, for example, be in the form of a tank which has the function of retaining any portion of refrigerant fluid that is still in liquid form after circulation of said refrigerant fluid within the refrigerant fluid circuit. The accumulator thus makes it possible to avoid a situation in which the refrigerant fluid in liquid form circulates as far as the compression device, since the latter is not able to act on the refrigerant fluid in liquid form.

The first branch and the second branch each comprise at least one heat exchanger. The second heat exchanger disposed on the first branch participates in a heat exchange leading to cooling of the vehicle. The third heat exchanger disposed on the second branch participates, for its part, indirectly in the heat treatment of one or more components of the vehicle that are liable to release heat during their operation, for example an electrical storage device of an electric motor of the vehicle.

According to one feature of the invention, the refrigerant fluid circuit comprises a control member configured to manage a circulation of the refrigerant fluid from the second branch to the accumulator and/or to the bypass branch. The control member makes it possible to determine a distribution of refrigerant fluid circulating in the second branch which is directed to the accumulator or bypasses the latter. Such a control member is therefore parameterizable so as to vary said refrigerant fluid distribution, and to do so as a function of the operating mode of the refrigerant fluid circuit.

According to one feature of the invention, the control member is disposed on the second branch, downstream of the third heat exchanger. Advantageously, the control member is disposed substantially in that region of the refrigerant fluid circuit at which the refrigerant fluid circulating in the second branch circulates to the accumulator and/or within the bypass branch.

According to one feature of the invention, the refrigerant fluid circuit is configured to circulate all of the refrigerant fluid circulating in the first branch to the accumulator. As a function of the need for cooling of the passenger compartment of the vehicle, the proportion of refrigerant fluid in liquid form at the output of the second heat exchanger can be significant. Advantageously, the refrigerant fluid circulating in the first branch therefore passes systematically through the accumulator such that the refrigerant fluid in liquid form can be stored and retained therein.

According to one feature of the invention, the first heat exchanger is configured to perform an exchange of heat between the refrigerant fluid circulating in the main branch and an exterior air flow to a passenger compartment of the vehicle. In order to be disposed in a path of the exterior air flow, the first heat exchanger can, for example, be arranged at a front end of the vehicle. As a function of the operating mode of the refrigerant fluid circuit, the first heat exchanger makes it possible to cool the refrigerant fluid by virtue of the exterior air flow. According to another operating mode, the first heat exchanger can also allow cooling of the exterior air flow by the refrigerant fluid.

According to one feature of the invention, the second heat exchanger is configured to perform an exchange of heat between the refrigerant fluid circulating in the first branch and an interior air flow intended to be sent into a passenger compartment of the vehicle. It is the interior air flow which therefore directly cools the passenger compartment of the vehicle by being cooled beforehand by the refrigerant fluid circulating in the first branch, and more particularly through the second heat exchanger. For this reason, the second heat exchanger can, for example, be integrated within a ventilation, heating and/or air conditioning installation, which ensures that the interior air flow is circulated in a cyclic manner in order to cool or heat the passenger compartment depending on the operating mode thereof.

According to one feature of the invention, the third heat exchanger is configured to perform an exchange of heat between the refrigerant fluid circulating in the second branch and a heat transfer liquid circuit. It is the heat transfer liquid which will directly cool the electrical storage device mentioned above. By cooling the latter, the heat transfer liquid will recover heat energy. This heat energy is then recovered by the refrigerant fluid circulating in the second branch during the exchange of heat between the refrigerant fluid and the heat transfer liquid occurring within the third heat exchanger.

According to one feature of the invention, the refrigerant fluid circuit comprises an expansion member disposed upstream of the first heat exchanger. The expansion member makes it possible to expand the refrigerant fluid before the latter passes through the heat exchanger. The expansion of the refrigerant fluid makes it possible to lower its pressure and its temperature in order to allow the take-up of heat energy. The expansion member has the particular feature of circulating the refrigerant fluid without necessarily expanding the latter, as a function of an operating mode of the refrigerant fluid circuit.

According to one feature of the invention, the refrigerant fluid circuit comprises an expansion element disposed upstream of the second heat exchanger. The expansion element makes it possible to lower the pressure and the temperature of the refrigerant fluid for the purpose of cooling the interior air flow via the second heat exchanger.

According to one feature of the invention, the refrigerant fluid circuit comprises an expansion device disposed upstream of the third heat exchanger. The expansion device makes it possible to lower the pressure and the temperature of the refrigerant fluid for the purpose of cooling, via the third heat exchanger, the heat transfer liquid circulating in the heat transfer liquid circuit.

According to one feature of the invention, the refrigerant fluid circuit can comprise a fourth heat exchanger which comprises a first section disposed on the first branch upstream of the expansion element and a second section disposed on the main branch downstream of the accumulator and upstream of the second convergence point, the fourth heat exchanger being configured to perform an exchange of heat between the refrigerant fluid circulating in the first branch and the refrigerant fluid circulating in the main branch, the bypass branch being configured to circulate the refrigerant fluid such that the latter bypasses the fourth heat exchanger and the accumulator. In other words, the fourth heat exchanger is internal to the refrigerant fluid circuit and ensures an exchange of heat between two fractions of refrigerant fluid circulating within two different portions of the circuit. The fourth heat exchanger simultaneously pre-cools the refrigerant fluid circulating in the first branch while heating the refrigerant fluid in the main branch at the output of the accumulator.

The pre-cooling of the refrigerant fluid circulating in the first branch makes it possible to cool it more efficiently via the expansion element before circulation through the second heat exchanger. In addition, increasing the temperature of the refrigerant fluid downstream of the accumulator makes it possible to evaporate any liquid phase of the refrigerant fluid that can form while circulating between the accumulator and the compression device. The refrigerant fluid thus reaches the compression device in an entirely gaseous form.

According to one feature of the invention, the refrigerant fluid circuit can comprise a fifth heat exchanger which comprises a first section disposed on the second branch upstream of the expansion device and a second section disposed on the bypass branch, the fifth heat exchanger being configured to perform an exchange of heat between the refrigerant fluid circulating in the second branch and the refrigerant fluid circulating in the bypass branch. According to the same principle as for the fourth heat exchanger, the fifth heat exchanger pre-cools the refrigerant fluid circulating in the second branch in order to create more effective expansion at the expansion device and therefore better cooling before passage through the third heat exchanger. On the other hand, heating the refrigerant fluid circulating within the bypass branch makes it possible to evaporate any liquid phase of the refrigerant fluid that can form during the circulation within the bypass branch, and this occurs before compression of the refrigerant fluid by the compression device.

According to one feature of the invention, the refrigerant fluid circuit can comprise a sixth heat exchanger disposed on the main branch, downstream of the compression device and upstream of the first heat exchanger, and configured to perform an exchange of heat between the refrigerant fluid circulating in the main branch and a heat transfer fluid. Since this exchange of heat takes place downstream of the compression device, the refrigerant fluid therefore circulates through the sixth heat exchanger at elevated temperature. This exchange of heat therefore makes it possible to pre-cool the refrigerant fluid. According to one example, the exchange of heat can be effected with the heat transfer liquid circulating in the heat transfer fluid circuit. In this situation, the exchange of heat makes it possible to pre-heat the heat transfer liquid with the aim of heating the passenger compartment. According to another example, the exchange of heat can be effected with the interior air flow in order to heat the passenger compartment directly. In such a situation, the sixth heat exchanger is integrated within the ventilation, heating and/or air conditioning installation, like the second heat exchanger.

According to one feature of the invention, the refrigerant fluid circuit can comprise a third branch which starts at a third divergence point situated on the main branch, downstream of the sixth heat exchanger and upstream of the first heat exchanger, and which terminates at a third convergence point situated on the main branch, downstream of the first heat exchanger and upstream of the first divergence point, the third branch comprising a first valve configured to manage the circulation of the refrigerant fluid within the third branch. In other words, the third branch allows the refrigerant fluid to bypass the first heat exchanger and the expansion member. The aim of the third branch is to circulate the refrigerant fluid as far as the expansion device and the third heat exchanger, without said refrigerant fluid having been previously expanded by the expansion member. The refrigerant fluid therefore circulates within the main branch and the third branch when the first valve is in an open position, and only within the main branch when the first valve is in a closed position.

According to another feature of the invention, the refrigerant fluid circuit can comprise a fourth branch, which starts at a fourth divergence point situated on the main branch, downstream of the first heat exchanger and upstream of the third convergence point, and which terminates at the first convergence point, or on the main branch downstream of the first convergence point and upstream of the accumulator, the fourth branch comprising a second valve configured to manage the circulation of the refrigerant fluid within the fourth branch. The fourth branch allows the refrigerant fluid to reach the accumulator directly after having passed through the first exchanger, for example during the implementation of an operating mode for heating the passenger compartment of the vehicle. For this purpose, the refrigerant fluid passing through the first heat exchanger is necessarily expanded by the expansion member. As a function of the position thereof, the second valve makes it possible to allow or to not allow the circulation of the refrigerant fluid in the fourth branch.

Advantageously, the first valve and the second valve are open at the same time such that the refrigerant fluid circulates both in the third and in the fourth branch. In this configuration, the refrigerant fluid is divided into two fractions at the third divergence point. A first fraction is expanded by the expansion member, passes through the first heat exchanger and then circulates through the fourth branch to reach the accumulator, whereas a second fraction bypasses the expansion member and the first heat exchanger in order to supply the third heat exchanger by being expanded beforehand by the expansion device.

According to one feature of the invention, the control member can be a variable-opening valve disposed on the second branch, downstream of the second divergence point and upstream of the first convergence point, or on the bypass branch, downstream of the second divergence point and upstream of the second convergence point. The refrigerant fluid can, after having passed through the third heat exchanger, circulate as far as the accumulator, or within the bypass branch. The variable-opening valve makes it possible to manage the quantity of refrigerant fluid circulating as far as the accumulator. Thus, as a function of a degree of opening of the variable-opening valve, it is possible to implement the distribution of the refrigerant fluid which circulates as far as the accumulator or which bypasses the latter. If the variable-opening valve is positioned on the second branch, the lower the degree of opening of the variable-opening valve, the higher the proportion of refrigerant fluid circulating within the bypass branch. If the variable-opening valve is positioned on the bypass branch, the lower the degree of opening of the variable-opening valve, the lower the proportion of refrigerant fluid circulating within the bypass branch.

According to one feature of the invention, the control member can be a three-way valve disposed on the second divergence point. All of the refrigerant fluid that has passed through the third heat exchanger therefore passes through the three-way valve. Said three-way valve is parameterized so as to manage the distribution of refrigerant fluid circulating to the accumulator or in the bypass branch.

The invention also covers a method for controlling a refrigerant fluid circuit as claimed in any one of the preceding claims, during which:
   in a mode for cooling a passenger compartment of the vehicle, the control member is adjusted such that all of the refrigerant fluid circulates in the bypass branch, in a mode for heating the passenger compartment of the vehicle, the control
   member is adjusted in order to determine a proportion of refrigerant fluid circulating to the accumulator and/or circulating in the bypass branch.

When the refrigerant fluid circuit operates according to the mode for cooling the passenger compartment of the vehicle, the refrigerant fluid notably circulates within the first branch in order to cool the passenger compartment of the vehicle. As has been indicated above, all of the refrigerant fluid circulating in the first branch reaches the accumulator. In parallel with this, the refrigerant fluid also circulates within the second branch with the aim of heat treatment via the passage through the third heat exchanger. In order to limit the pressure drop and to not cause the compressor to work too hard via too great a proportion of refrigerant fluid passing through the accumulator, all of the refrigerant fluid circulating in the second branch at the output of the third heat exchanger is directed into the bypass branch by the control member.

According to one feature of the method, in the mode for heating the passenger compartment of the vehicle, the refrigerant fluid recovers heat energy by passing through the third heat exchanger. In this mode, the refrigerant fluid therefore does not circulate within the first branch. The circulation is therefore effected only within the second branch. Since the refrigerant fluid cannot completely bypass the accumulator, the refrigerant fluid therefore has to at least partially circulate in the second branch as far as the accumulator. The control member is then adapted to distribute the refrigerant fluid in an appropriate manner for the operating mode.

BRIEF DESCRIPTION OF DRAWINGS

Further features and advantages of the invention will become more clearly apparent both from the following description and from a number of exemplary embodiments, which are given by way of non-limiting indication with reference to the attached schematic drawings, in which.

DETAILED DESCRIPTION OF THE INVENTION

The terms upstream and downstream used in the following description relate to the circulation direction of the refrigerant fluid.

Figure 1:
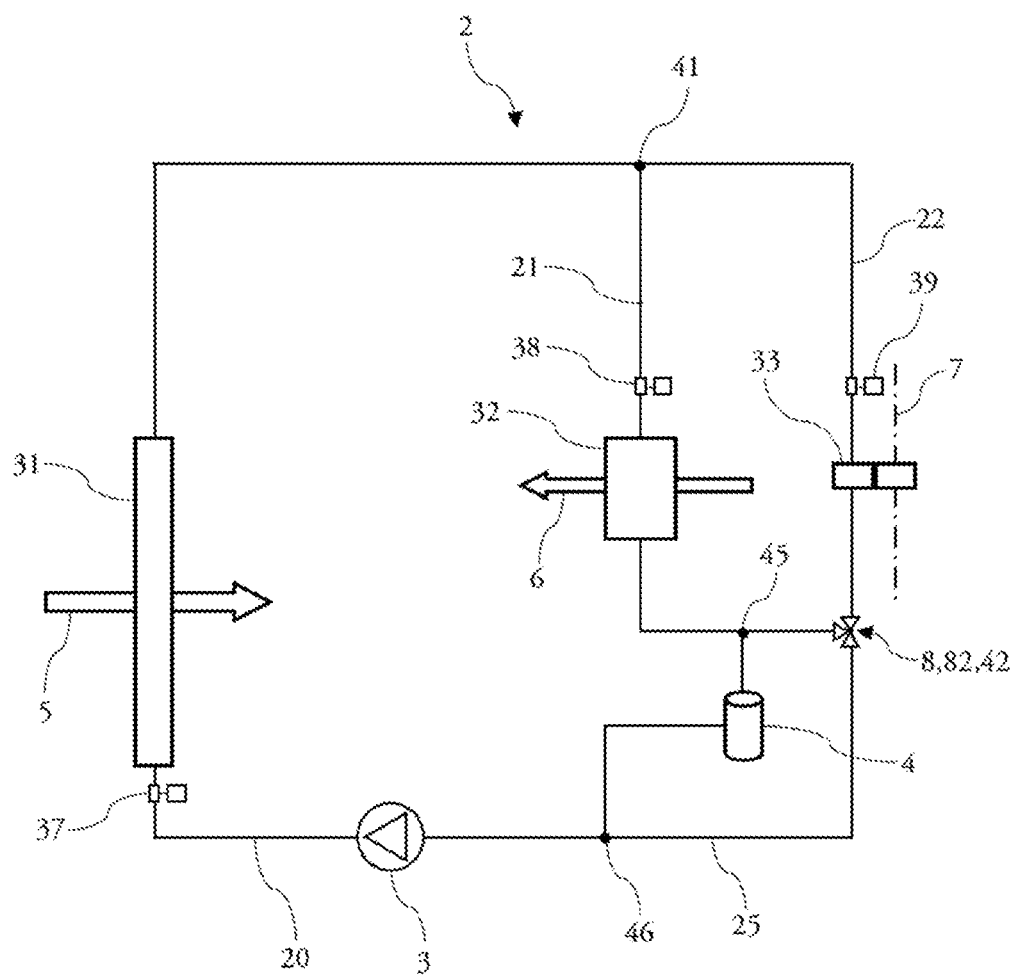
FIG. 1 shows a first embodiment of a refrigerant fluid circuit according to the invention.
Figure 2:
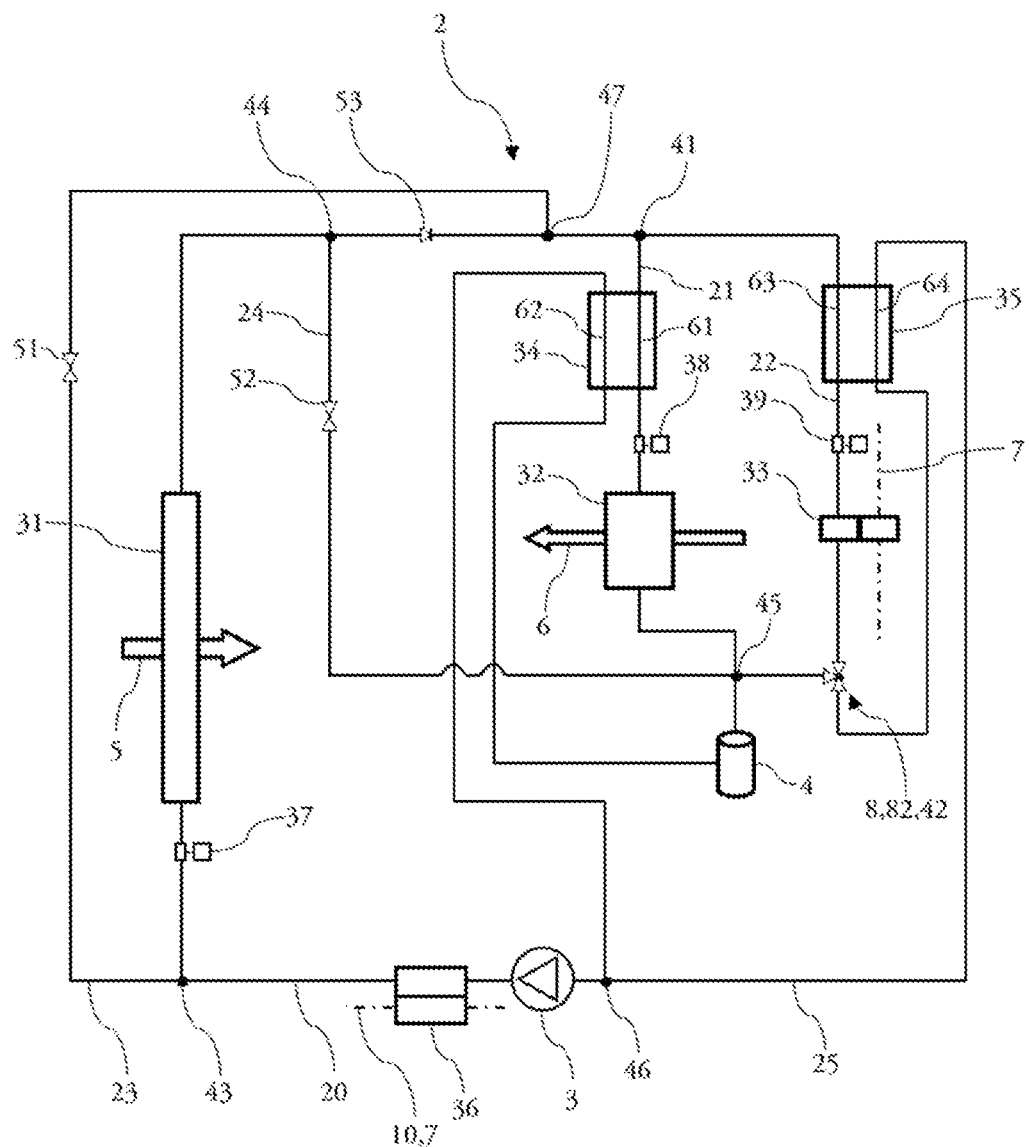
FIG. 2 shows a second embodiment of the refrigerant fluid circuit.
Figure 3:
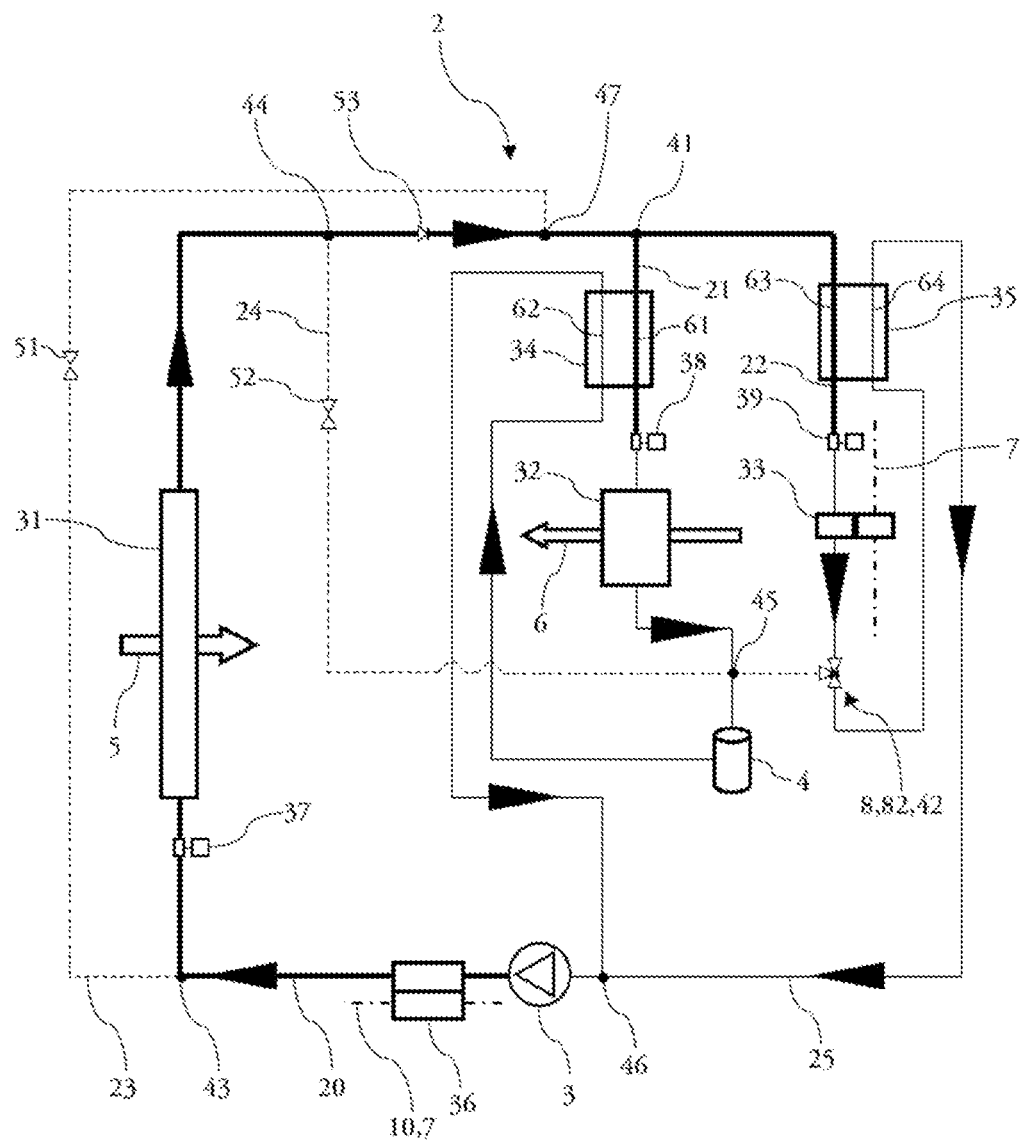
FIG. 3 shows the circulation of the refrigerant fluid within the second embodiment of the refrigerant fluid circuit according to a mode for cooling a passenger compartment of the vehicle.
Figure 4:
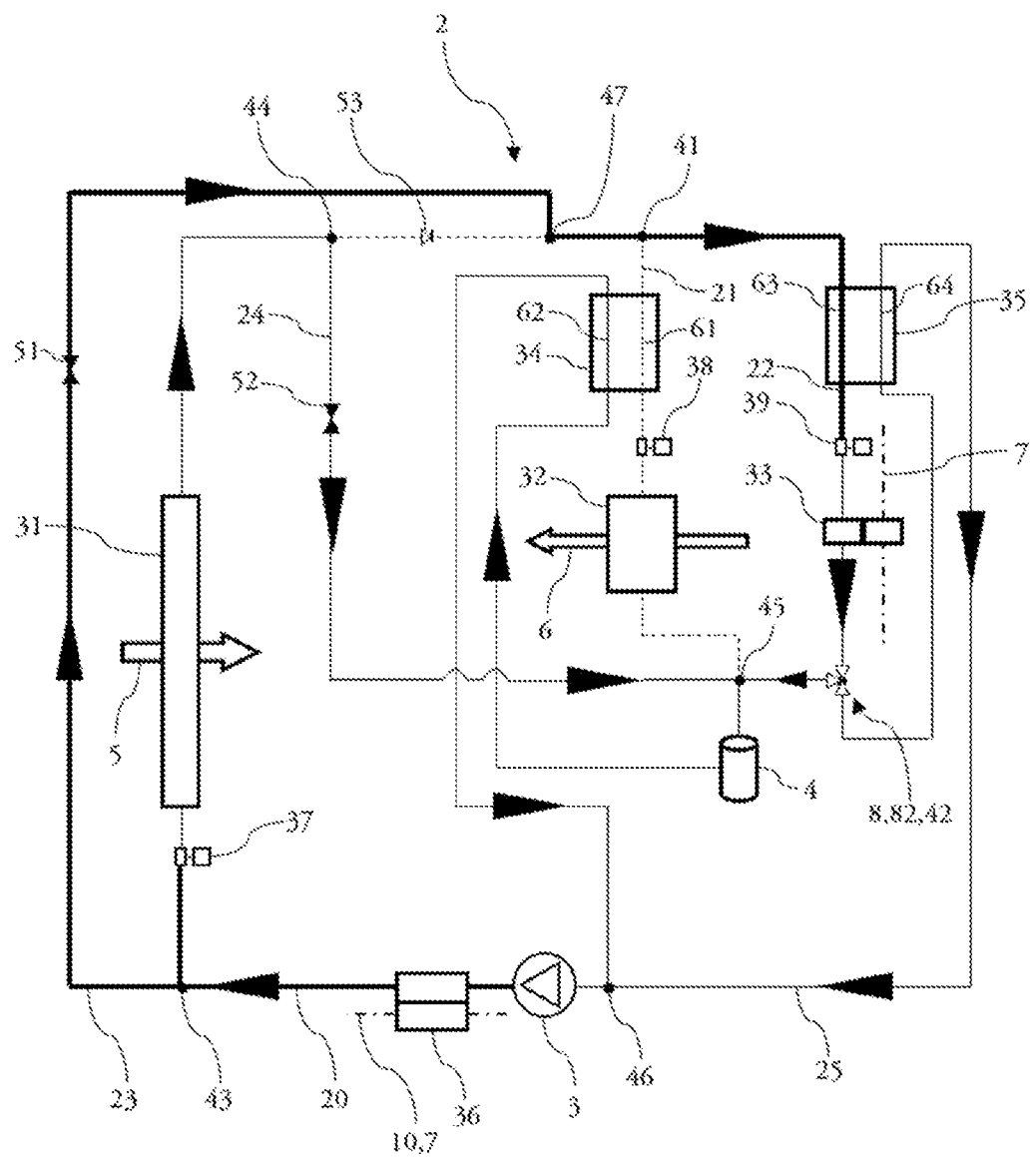
FIG. 4 shows the circulation of the refrigerant fluid within the second embodiment of the refrigerant fluid circuit according to a mode for heating the passenger compartment of the vehicle.
Figure 5:
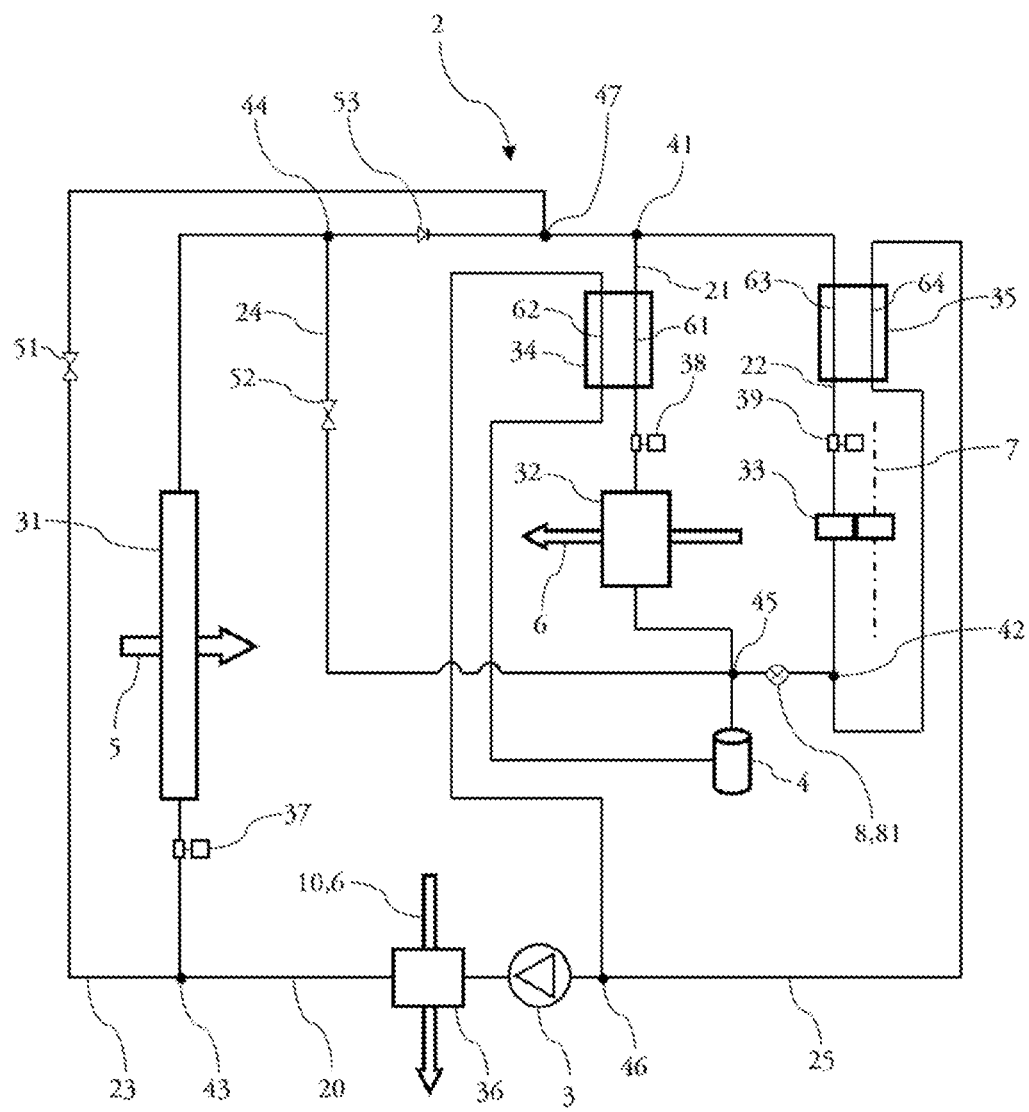
FIG. 5 shows the second embodiment of the refrigerant fluid circuit comprising an alternative control member.

In FIGS. 1, 2 and 5, a refrigerant fluid circuit 2 is illustrated in solid lines. In FIGS. 3 to 4, the portions through which the refrigerant fluid is passing are shown in solid lines and the portions without circulation of refrigerant fluid are shown in dotted lines. Furthermore, the circulation of the refrigerant fluid is illustrated with its circulation direction indicated by arrows. The solid lines indicating the circulation of fluid are also of different thickness with regard to the refrigerant fluid circuit 2. More specifically, the thicker solid lines correspond to portions in which the refrigerant fluid circulates at high pressure, and the thinner solid lines correspond to portions in which the refrigerant fluid circulates at low pressure.

The terms "first", "second", etc. used in the description are not intended to indicate a level of hierarchy or to order the elements they accompany. These terms serve to distinguish the elements which they accompany and can be interchanged without narrowing the scope of the invention.

FIG. 1 shows the refrigerant circuit 2 without indicating the circulation of fluid and according to a first embodiment. The refrigerant fluid circuit 2 is configured to form part of a heat treatment system, for example within a vehicle. The refrigerant fluid can for example be a fluid of the R134a or R1234yf type.

The refrigerant fluid circuit 2 comprises a main branch 20, which extends from a first convergence point 45 as far as a first divergence point 41. The first divergence point 41, and all of the divergence points presented hereinafter, correspond to points at which a branch is divided into a plurality of branches. The first convergence point 45, and all of the convergence points presented hereinafter, correspond to points at which a plurality of branches merge into a single branch.

The main branch 20 comprises an accumulator 4, a compression device 3, an expansion member 37 and a first heat exchanger 31, in that order in a circulation direction of the refrigerant fluid. The compression device 3 makes it possible to circulate the refrigerant fluid in gaseous form. Said refrigerant fluid is brought to high pressure and high temperature before circulating downstream of the compression device 3.

The compression device 3 can only compress the refrigerant fluid in gaseous form. It is for this reason that the accumulator 4 is disposed upstream of the compression device 3. The accumulator 4 makes it possible to retain any liquid portion of the refrigerant fluid circulating in the main branch 20 between the first convergence point 45 and the accumulator 4. Thus only the refrigerant fluid in gaseous form circulates from the accumulator 4 as far as the compression device 3.

The first heat exchanger 31 is, for its part, situated downstream of the compression device 3. The expansion member 37 is disposed upstream of the first heat exchanger 31 and downstream of the compression device 3. The expansion member 37 makes it possible to expand the refrigerant fluid after the latter has been brought to high pressure by the compression device 3. The expansion member 37 nevertheless has the capacity to allow the refrigerant fluid to pass through without expanding it. Thus, the refrigerant fluid can pass through the first heat exchanger 31 at high pressure or at low pressure, the pressure of the refrigerant fluid being dependent on an operating mode of the refrigerant fluid circuit 2.

The first heat exchanger 31 is configured to perform an exchange of heat between the refrigerant fluid passing through it and an exterior air flow 5 to a passenger compartment of the vehicle. For this reason, the first heat exchanger 31 can, for example, be positioned at a front end of the vehicle in order to be arranged in a path of said exterior air flow 5. The function of the first heat exchanger 31 is dependent on the operating mode of the refrigerant fluid circuit 2.

At the first divergence point 41, the refrigerant fluid circuit 2 is divided into a first branch 21 and into a second branch 22. Each of the branches comprises a heat exchanger and an expansion means upstream of each of said heat exchangers. The latter are configured to meet the needs of the heat treatment system of the vehicle.

The first branch 21 comprises a second heat exchanger 32 and an expansion element 38 upstream of the second heat exchanger 32. The second heat exchanger 32 is configured to perform an exchange of heat between the refrigerant fluid and an interior air flow 6 sent to the passenger compartment of the vehicle. For this reason, the second heat exchanger 32 can be arranged within a ventilation, heating and/or air conditioning installation (not shown). The second heat exchanger 32 thus makes it possible to cool the interior air flow 6 such that the latter is sent into the passenger compartment in order to air-condition the latter. The expansion element 38 makes it possible to expand the refrigerant fluid such that the latter passes through the second heat exchanger 32 at low temperature for the purpose of cooling the interior air flow 6. The first branch 21 extends as far as the first convergence point 45. All of the refrigerant fluid passing through the first branch 21 therefore circulates as far as the accumulator 4.

The second branch 22 comprises a third heat exchanger 33, and also an expansion device 39 arranged upstream of said third heat exchanger 33. The third heat exchanger 33 is configured to perform an exchange of heat between the refrigerant fluid and a heat transfer liquid circuit, shown in part by a dash-dotted line. The heat transfer liquid notably has the function of ensuring a heat treatment, more particularly a cooling, of one or more electrical components of the vehicle, for example an electrical storage device (not shown). The refrigerant fluid circulating through the third heat exchanger 33 therefore has the function of indirectly cooling the electrical storage device by recovering heat energy from the heat transfer liquid such that the latter can cool the electrical storage device.

The second branch 22, like the first branch 21, extends from the first divergence point 41 to the first convergence point 45. The second branch 22 nevertheless comprises a second divergence point 42, disposed downstream of the third heat exchanger 33 and upstream of the first convergence point 45. In FIG. 1, the second divergence point 42 comprises a control member 8 in the form of a three-way valve 82. Said valve makes it possible to direct the refrigerant fluid to the accumulator 4, or else to a bypass branch 25.

The bypass branch 25 makes it possible to establish a connection between the second branch 22 and the compression device 3 by bypassing the accumulator 4. To this end, the bypass branch 25 extends from the second convergence point 42 as far as a second convergence point 46 situated on the main branch 20, downstream of the accumulator 4 and upstream of the compression device 3.

The control member 8 can thus be controlled remotely in order to manage the distribution of the refrigerant fluid at the output of the third heat exchanger 33 to the accumulator 4 or within the bypass branch 25. This distribution is dependent on the operating mode of the refrigerant fluid circuit 2, as will be described in detail hereinafter. The ability to distribute the refrigerant fluid exiting the third heat exchanger 33 so as to reach or bypass the accumulator 4 makes it possible to conserve the circulating charge of the refrigerant fluid, while prolonging the service life of the compression device 3, which can be used excessively in the event of a pressure drop of the refrigerant fluid.

FIG. 2 shows a second embodiment of the refrigerant fluid circuit 2, which is more complex than the first embodiment shown in FIG. 1. Reference will be made to the description of FIG. 1 with regard to everything concerning the structural similarities of the two embodiments.

In FIG. 2, the refrigerant fluid circuit 2 comprises a fourth heat exchanger 34 and a fifth heat exchanger 35. These two heat exchangers are internal to the refrigerant fluid circuit. In other words, the two heat exchangers are configured to perform an exchange of heat between two portions of the refrigerant fluid circuit 2.

The fourth heat exchanger 34 comprises a first section 61 situated on the first branch 21, downstream of the first divergence point 41 and upstream of the expansion element 38, and a second section 62 situated on the main branch 20, downstream of the accumulator 4 and upstream of the second convergence point 46. Hence, the bypass branch 25 ensures that the refrigerant fluid circulating therein reaches the compression device 3 without passing through the accumulator 4 and without circulating within the second section 62 of the fourth heat exchanger 34.

The fourth heat exchanger 34 makes it possible to pre-cool the refrigerant fluid circulating in the first branch 21 before the expansion thereof via the expansion element 38. The fourth heat exchanger 34 also makes it possible to re-heat the refrigerant fluid circulating between the accumulator 4 and the compression device 3, and thus to evaporate a potential fraction of the refrigerant fluid that has condensed at the output of the accumulator 4.

The fifth heat exchanger 35 comprises a first section 63 situated on the second branch 22, downstream of the first divergence point 41 and upstream of the expansion device 39, and a second section 64 situated on the bypass branch 25, downstream of the second divergence point 42 and upstream of the second convergence point 46.

The fifth heat exchanger 35 makes it possible to pre-cool the refrigerant fluid circulating in the second branch 22 before the expansion thereof via the expansion device 39. The fifth heat exchanger 35 also makes it possible to re-heat the refrigerant fluid circulating within the bypass branch 25 in order to evaporate a potential fraction of the refrigerant fluid that has condensed after having exited the third heat exchanger 33.

The refrigerant fluid circuit 2 also comprises a sixth heat exchanger 36 installed on the main branch 20, downstream of the compression device 3 and upstream of the expansion member 37. The sixth heat exchanger 36 is configured to perform an exchange of heat between the refrigerant fluid and a heat transfer fluid 10. In FIGS. 2 to 4, the heat transfer fluid 10 is the heat transfer liquid circulating within the heat transfer liquid circuit 7. The exchange of heat performed on the sixth heat exchanger 36 makes it possible to simultaneously pre-cool the refrigerant fluid, the latter being at high temperature following the compression by the compression device 3, and to heat the heat transfer liquid, for example with the aim of heating the passenger compartment of the vehicle indirectly.

The refrigerant fluid circuit 2 also comprises a third branch 23 starting at a third divergence point 43 situated on the main branch 20, downstream of the sixth heat exchanger 36. The third branch 23 extends as far as a third convergence point 47, situated on the main branch 20 downstream of the first heat exchanger 31 and upstream of the first divergence point 41.

The third branch 23 thus allows the refrigerant fluid to circulate from the compression device 3 as far as the first divergence point 41 without passing through the expansion member 37 and the first heat exchanger 31. In order for the refrigerant fluid circulating in the third branch 23 to not recirculate to the first heat exchanger 31 once it has arrived at the third convergence point 47, the main branch 20 comprises a non-return valve 53 downstream of the first heat exchanger 31 and upstream of the third convergence point 47. Furthermore, the third branch 23 comprises a first valve 51 in order to allow or to not allow the circulation of the refrigerant fluid in the third branch 23.

The refrigerant fluid circuit 2 lastly comprises a fourth branch 24, which starts at a fourth divergence point 44 situated on the main branch 20, downstream of the first heat exchanger 31 and upstream of the third convergence point 47, and which terminates at the first convergence point 45. The fourth branch 24 comprises a second valve 52 in order to allow or to not allow the circulation of the refrigerant fluid in the fourth branch 24.

FIG. 3 shows the circulation of the refrigerant fluid according to a mode for cooling the passenger compartment of the vehicle. This mode for cooling the passenger compartment of the vehicle consists in simultaneously cooling the passenger compartment of the vehicle and cooling the electrical storage device of the vehicle.

To this end, the refrigerant fluid is first circulated at high pressure and at high temperature by the compression device 3, and is then pre-cooled by the heat transfer liquid via the sixth heat exchanger 36.

The refrigerant fluid then circulates as far as the expansion member 37. Since said expansion member is entirely open, the refrigerant fluid is then not expanded and passes through the first heat exchanger 31. Within the first heat exchanger 31, the refrigerant fluid is cooled by the exterior air flow 5.

The refrigerant fluid then circulates as far as the first divergence point 41, at which it is divided into two fractions. A first fraction circulates in the first branch 21 in order to participate in the cooling of the passenger compartment of the vehicle, whereas a second fraction circulates in the second branch 22 in order to participate in the cooling of the electrical storage device.

The first fraction of refrigerant fluid is first pre-cooled by circulating in the first section 61 of the fourth heat exchanger 34, and is then expanded by the expansion element 38 and subsequently passes through the second heat exchanger 32. The expansion of the refrigerant fluid makes it possible to reduce its pressure and its temperature. The refrigerant fluid therefore passes through the second heat exchanger 32 at low temperature in order to cool the interior air flow 6 passing through the second heat exchanger 32. The cooled interior air flow 6 is then directed to the passenger compartment of the vehicle in order to air-condition the latter.

At the output of the second heat exchanger 32, the refrigerant fluid continues to circulate within the first branch 21 until it reaches the first convergence point 47, then the main branch 20 as far as the accumulator 4. All of the first fraction of refrigerant fluid reaches the accumulator 4. Said accumulator retains a potential liquid portion of the first fraction of the refrigerant fluid, whereas a gaseous portion continues to circulate within the main branch 20 as far as the second section 62 of the fourth heat exchanger 34, before finally reaching the compression device 3.

The second fraction of refrigerant fluid circulates, for its part, in the second branch 22. This second fraction is first pre-cooled by circulating in the first section 63 of the fifth heat exchanger 35, and is then expanded by the expansion device 39 and subsequently passes through the third heat exchanger 33. Just as for the expansion element 38, the expansion of the refrigerant fluid by the expansion device 39 makes it possible to reduce its pressure and its temperature.

The refrigerant fluid passes through the third heat exchanger 33 at low temperature in order to perform an exchange of heat energy with the heat transfer liquid circulating in the heat transfer liquid circuit 7. The heat transfer liquid circuit 7 is configured to cool the electrical storage device, the latter being likely to release heat that can damage it. Thus the heat transfer liquid is cooled by the refrigerant fluid via the third heat exchanger. Then, the cold heat transfer liquid cools the electrical storage element, for example also by exchange of heat, and is therefore at high temperature after such a cooling operation. The third heat exchanger 33 therefore makes it possible to cool the heat transfer liquid such that the latter can constantly cool the electrical storage device.

After having passed through the third heat exchanger 33, the refrigerant fluid reaches the second divergence point 42, at which the three-way valve 82 used as control member 8 is able to direct the refrigerant fluid circulating in the second branch 22 as far as the first convergence point 45 and the accumulator 4 or within the bypass branch 25. According to this mode for cooling the passenger compartment of the vehicle, the three-way valve 82 redirects all of the refrigerant fluid that has passed through the third heat exchanger 33 to the bypass branch 25. Access to the first convergence point 45 is therefore completely closed.

By circulating within the bypass branch 25, the refrigerant fluid bypasses the fourth heat exchanger 34 and the accumulator 4. However, the refrigerant fluid circulates through the fifth heat exchanger 35 which has the effect of increasing the temperature of the refrigerant fluid in the bypass branch 25 in order to ensure that no condensation phenomenon has occurred during the circulation of the refrigerant fluid within the bypass branch 25. The refrigerant fluid then reaches the main branch 20 and the compression device 3, via the second convergence point 46.

In this mode for cooling the passenger compartment of the vehicle, the first valve 51 and the second valve 52 are in a closed position such that the refrigerant fluid does not circulate within the third branch 23 and the fourth branch 24.

FIG. 4 shows the second embodiment of the refrigerant fluid circuit 2, and more particularly the circulation of the refrigerant fluid according to a mode for heating the passenger compartment of the vehicle. The aim of such a mode is to heat the passenger compartment of the vehicle while cooling the electrical storage device.

The circulation of the refrigerant fluid is once again initiated by the compression device 3. The refrigerant fluid, then at high temperature, exchanges its heat energy with the heat transfer liquid within the sixth heat exchanger 36. It is the heat transfer liquid which, once heated by the exchange of heat performed by the sixth heat exchanger 36, participates in the heating of the passenger compartment of the vehicle, for example by exchange of heat with the interior air flow 6.

After having passed through the sixth heat exchanger 36, the refrigerant fluid reaches the third divergence point 43. Since the first valve 51 is open, the refrigerant fluid can circulate within the third branch 23. The refrigerant fluid therefore separates into two fractions. A first fraction continues to circulate within the main branch 20 and is expanded by the expansion member 37 before passing through the first heat exchanger 31. The expansion of the refrigerant fluid notably makes it possible to cool the exterior air flow 5 such that the latter can for example recover heat energy by passing through a third-party heat exchanger situated downstream of the first heat exchanger 31 with respect to the circulation direction of the exterior air flow 5.

The first fraction of refrigerant fluid, after having passed through the first heat exchanger 31, reaches the fourth divergence point 44 and circulates within the fourth branch 24, since the second valve 52 is open. This fourth branch 24 allows the refrigerant fluid at the output of the first heat exchanger 31 to reach the first convergence point 45 and the accumulator 4 directly without passing through the first branch 21 or through the second branch 22. The aim here is therefore to heat the heat transfer liquid via the sixth heat exchanger 36, and possibly to cool the exterior air flow 5.

At the output of the accumulator 4, the refrigerant fluid circulates as far as the compression device 3 in an identical manner to the refrigerant fluid circulating in the first branch 21 according to the mode for cooling the passenger compartment of the vehicle, that is to say by circulating in the main branch 20 and more particularly by passing through the second section 62 of the fourth heat exchanger 34, this passage having no effect given that the refrigerant fluid does not circulate in the first branch 21.

Concerning the second fraction of refrigerant fluid, the latter circulates within the third branch 23 for the purpose of bypassing the first heat exchanger 31 as far as the third convergence point 47. The non-return valve 53 does not allow the second fraction of refrigerant fluid to circulate to the first heat exchanger 31 once it has arrived at the third convergence point 47. The refrigerant fluid then circulates only in the second branch 22, the first branch 21 participating in the cooling of the passenger compartment of the vehicle.

Just as for the mode for cooling the passenger compartment of the vehicle, the refrigerant fluid circulates in the second branch 22, is pre-cooled by the fifth heat exchanger 35, and is then expanded by the expansion device 39 before passing through the third heat exchanger 33 in order to recover heat energy from the heat transfer liquid.

Following this, the second fraction of the refrigerant fluid reaches the second divergence point 42. According to the mode for heating the passenger compartment, it is possible that the recovery of heat energy occurring at the third heat exchanger 33 is not sufficient to effectively evaporate the refrigerant fluid in its entirety. To overcome this, the three-way valve 82 is parameterized to allow a part of the second fraction of refrigerant fluid to circulate as far as the end of the second branch 22 and therefore as far as the accumulator 4 in order to retain the refrigerant fluid in liquid form. The three-way valve 82 can for example be parameterized to cause 10 to 20% of the second fraction of refrigerant fluid to circulate to the accumulator 4.

The remainder of the second fraction circulates within the bypass branch 25. The circulation within the bypass branch 25 is effected until the main branch 20 is reached, upstream of the compression device 3, in a manner identical to the refrigerant fluid circulating in the bypass branch 25 according to the mode for cooling the passenger compartment of the vehicle, that is to say notably by circulating in the second section 64 of the fifth heat exchanger 35, this having the effect of increasing the temperature of the refrigerant fluid circulating in the bypass branch.

FIG. 5 shows the second embodiment of the refrigerant fluid circuit 2, comprising an alternative control member 8 to the three-way valve presented in the preceding FIGS. In FIG. 5, the control member 8 is in the form of a variable-opening valve 81 that is disposed not on the second divergence point 42 as has been illustrated above, but on the second branch 22, downstream of the second divergence point 42 and upstream of the first convergence point 45. The variable-opening valve 81 can for example be controlled remotely in order to determine a degree of opening that allows a desired distribution of the refrigerant fluid. The higher the degree of opening of the variable-opening valve 81, the more the refrigerant fluid at the output of the third heat exchanger 33 circulates to the accumulator 4. Conversely, the lower the degree of opening of the variable-opening valve 81, the less the refrigerant fluid at the output of the third heat exchanger 33 circulates to the accumulator 4, and therefore the more the refrigerant fluid at the output of the third heat exchanger 33 circulates within the bypass branch 25.

In FIG. 5, the variable-opening valve 81 is disposed on the second branch 22, but it is also possible for it to be positioned on the bypass branch 25, between the second divergence point 42 and the second section 64 of the fifth heat exchanger 35. In this configuration, the lower the degree of opening of the variable-opening valve 81, the less the refrigerant fluid at the output of the third heat exchanger 33 circulates within the bypass branch 25, and therefore the more the refrigerant fluid at the output of the third heat exchanger 33 circulates to the accumulator 4.

The control member 8 can therefore be of diverse nature, the essential point being that it is possible to control it remotely so as to perform any distribution of the refrigerant fluid exiting the third heat exchanger 33.

The sixth heat exchanger 36 also differs from FIGS. 2 to 4, notably in that it is configured to perform an exchange of heat directly with the interior air flow 6 and not indirectly with the heat exchange liquid as described above. It is then the interior air flow 6 which acts as heat transfer fluid 10. According to this alternative, the sixth heat exchanger 36 can then be arranged within the ventilation, heating and/or air conditioning installation mentioned above, like the second heat exchanger 32.

Of course, the invention is not limited to the examples that have just been described, and numerous modifications can be made to these examples without departing from the scope of the invention.

The invention, as has just been described, does indeed achieve its stated objective, and makes it possible to propose a simplified refrigerant fluid circuit that nevertheless makes it possible to avoid any pressure drop by virtue of a bypass branch for bypassing the accumulator. Variants that are not described here can be implemented without departing from the context of the invention, provided that, in accordance with the invention, they comprise a refrigerant fluid circuit according to the invention.

What is claimed is:

1. A refrigerant fluid circuit for a heat treatment system, comprising:
a main branch starting at a first convergence point and terminating at a first divergence point and including at least one accumulator, a compression device and a first heat exchanger;
a first branch and a second branch, both starting at the first divergence point and terminating at the first convergence point, the first branch including a second heat exchanger, the second branch including a third heat exchanger,
wherein the refrigerant fluid circuit includes a bypass branch which starts at a second divergence point situated on the second branch, downstream of the third heat exchanger, and which terminates at a second convergence point situated on the main branch, downstream of the at least one accumulator and upstream of the compression device.

2. The refrigerant fluid circuit as claimed in claim 1, further comprising a control member configured to manage a circulation of the refrigerant fluid from the second branch to the at least one accumulator and to the bypass branch.

3. The refrigerant fluid circuit as claimed in claim 2, wherein the control member is disposed on the second branch, downstream of the third heat exchanger.

4. The refrigerant fluid circuit as claimed in claim 1, wherein the first heat exchanger is configured to perform an exchange of heat between the refrigerant fluid circulating in the main branch and an air flow exterior to a passenger compartment of a vehicle.

5. The refrigerant fluid circuit as claimed in claim 1, wherein the second heat exchanger is configured to perform an exchange of heat between the refrigerant fluid circulating in the first branch and an interior air flow intended to be sent into a passenger compartment of a vehicle.

6. The refrigerant fluid circuit as claimed in claim 1, wherein the third heat exchanger is configured to perform an exchange of heat between the refrigerant fluid circulating in the second branch and a heat transfer liquid circuit.

7. The refrigerant fluid circuit as claimed in claim 1, further comprising an expansion member disposed upstream of the first heat exchanger.

8. The refrigerant fluid circuit as claimed in claim 1, further comprising an expansion element disposed upstream of the second heat exchanger.

9. The refrigerant fluid circuit as claimed in claim 1, further comprising an expansion device disposed upstream of the third heat exchanger.

10. The refrigerant fluid circuit as claimed in claim 8, further comprising a fourth heat exchanger which includes a first section disposed on the first branch upstream of the expansion element and a second section disposed on the main branch downstream of the at least one accumulator and upstream of the second convergence point, the fourth heat exchanger being configured to perform an exchange of heat between the refrigerant fluid circulating in the first branch and the refrigerant fluid circulating in the main branch, the bypass branch being configured to circulate the refrigerant fluid such that the latter bypasses the fourth heat exchanger and the at least one accumulator.

11. The refrigerant fluid circuit as claimed in claim 2, wherein the control member is a variable-opening valve disposed on the second branch, downstream of the second divergence point and upstream of the first convergence point, or on the bypass branch, downstream of the second divergence point and upstream of the second convergence point.

12. The refrigerant fluid circuit as claimed in claim 2, wherein the control member is a three-way valve disposed on the second divergence point.

13. A method for controlling a refrigerant fluid circuit for a heat treatment system, the refrigerant fluid circuit including a main branch starting at a first convergence point and terminating at a first divergence point and including at least one accumulator, a compression device and a first heat exchanger, the refrigerant fluid circuit including a first branch and a second branch, both starting at the first divergence point and terminating at the first convergence point, the first branch including a second heat exchanger, the second branch including a third heat exchanger, wherein the refrigerant fluid circuit includes a bypass branch which starts at a second divergence point situated on the second branch, downstream of the third heat exchanger, and which terminates at a second convergence point situated on the main branch, downstream of the at least one accumulator and upstream of the compression device, the refrigerant fluid circuit further including a control member configured to manage a circulation of the refrigerant fluid from the second branch to the at least one accumulator or to the bypass branch, the method comprising:
- in a mode for cooling a passenger compartment of the vehicle, adjusting the control member such that all of the refrigerant fluid circulates in the bypass branch,
- in a mode for heating the passenger compartment of the vehicle, adjusting the control member in order to determine a proportion of refrigerant fluid circulating to the at least one accumulator and circulating in the bypass branch.

14. The method as claimed in claim 13, wherein, in the mode for heating the passenger compartment of the vehicle, the method includes recovering heat energy by passing the refrigerant fluid through the third heat exchanger.

15. A method for controlling a refrigerant fluid circuit for a heat treatment system, the refrigerant fluid circuit including a main branch starting at a first convergence point and terminating at a first divergence point and including at least one accumulator, a compression device and a first heat exchanger, the refrigerant fluid circuit including a first branch and a second branch, both starting at the first divergence point and terminating at the first convergence point, the first branch including a second heat exchanger, the second branch including a third heat exchanger, wherein the refrigerant fluid circuit includes a bypass branch which starts at a second divergence point situated on the second branch, downstream of the third heat exchanger, and which terminates at a second convergence point situated on the main branch, downstream of the at least one accumulator and upstream of the compression device, the refrigerant fluid circuit further including a control member configured to manage a circulation of the refrigerant fluid from the second branch to the at least one accumulator or to the bypass branch, the method comprising:
- in a mode for cooling a passenger compartment of the vehicle, adjusting the control member such that all of the refrigerant fluid circulates in the bypass branch,
- in a mode for heating the passenger compartment of the vehicle, adjusting the control member in order to determine a proportion of refrigerant fluid circulating to the at least one accumulator or circulating in the bypass branch.

* * * * *